United States Patent
Davlin et al.

(10) Patent No.: US 10,660,347 B2
(45) Date of Patent: *May 26, 2020

(54) FAT COMPOSITION (71) Applicant: General Mills, Inc., Minneapolis, MN (US)

(72) Inventors: Catherine Davlin, Minneapolis, MN (US); Ashley Marrin, Minneapolis, MN (US); Jon Duke Seibold, Pully (CH); Michael Allen, Big Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 317 days.

This patent is subject to a terminal disclaimer.

(21) Appl. No.: 15/425,741

(22) Filed: Feb. 6, 2017

(65) Prior Publication Data
US 2018/0220670 A1 Aug. 9, 2018

(51) Int. Cl.
A23D 9/00 (2006.01)
A23D 7/04 (2006.01)
A21D 13/38 (2017.01)
A21D 13/32 (2017.01)
A23D 9/04 (2006.01)

(52) U.S. Cl.
CPC .............. A23D 9/00 (2013.01); A21D 13/32 (2017.01); A21D 13/38 (2017.01); A23D 7/04 (2013.01); A23D 9/04 (2013.01)

(58) Field of Classification Search
CPC ........ A21D 13/38; A21D 13/32; A21D 13/42; A21D 13/22; A23D 9/04; A23D 7/04; A23D 9/00
See application file for complete search history.

(56) References Cited

U.S. PATENT DOCUMENTS

2011/0059221 A1* 3/2011 Andou ............... A21D 2/16
426/606
2011/0177227 A1 7/2011 Cruz Serna et al.

FOREIGN PATENT DOCUMENTS

EP 1731594 A1 12/2006
WO 2015/193693 A1 12/2015

OTHER PUBLICATIONS

Ribeiro et al., "Crystallization modifiers in lipids systems" J. Food Sci Technol, 52(7): 3925-3946 (Jul. 2015). (Year: 2015).*
"Iodine Value". Available online at https://www.britannica.com/science/iodine-value. (Year: 1998).*
"13 Things to Know About Coconut Flour". Available online at https://www.mnutiva.com/kitchen/13-things-to-know-about-cocnut-flour/ (Year: 2014).*

(Continued)

Primary Examiner — Erik Kashnikow
Assistant Examiner — Assaf Zilbering
(74) Attorney, Agent, or Firm — Diederiks & Whitelaw, PLC; Gregory P. Kaihoi, Esq.; Rachel A. Kahler (57) ABSTRACT Fat compositions are described that comprise 95% by weight of a blend of a first lauric fat and a crystal modifier. A crystal modifier included in fat compositions described herein is an interesterified blend of a second lauric fat and a palmitic fat. Also described are methods of making a fat composition described herein, and food ingredients and food products that include a fat composition described herein.

21 Claims, 6 Drawing Sheets (56) References Cited

OTHER PUBLICATIONS

AOCS Cd 1b-87 (Firestone, D. (Ed.), (2009), *Official Methods and Recommended Practices of the AOCS* ($6^{th}$ ed.) AOCS Press).
AOCS Cd 16b-93 (Firestone, D. (Ed.), (2009), *Official Methods and Recommended Practices of the AOCS* ($6^{th}$ ed.) AOCS Press).
AOCS Cc 18-80 (Firestone, D. (Ed.), (2009), *Official Methods and Recommended Practices of the AOCS* ($6^{th}$ ed.) AOCS Press).
"*Terra X-Ray Diffraction and X-Ray Fluorescence Analyzer User's Manual*" Olympus Scientific Solutions Americas, (May 2014).

\* cited by examiner

Figure 6

FAT COMPOSITION

BACKGROUND

Fats and oils are important components of many foods. They can provide functional benefits to food products, such as contributing to an enjoyable texture and flavor to such food products. However, it has been discovered that fats that have been partially hydrogenated to provide various functional benefits can also contribute to health risks by the introduction of trans-fatty acids into the diet. As a result, new fat compositions made from non-partially hydrogenated fats are needed to provide functional benefits without contributing non-naturally occurring trans-fatty acids to foods which contain them.

SUMMARY

The present disclosure relates to a high lauric fat composition with favorable handling characteristics while retaining a desirable mouthfeel.

Provided herein are fat compositions. A fat composition, includes at least 95% by weight of a blend of 55% to 90% by weight of the fat composition of a first lauric fat, and 5% to 45% by weight of the fat composition of a crystal modifier. A crystal modifier consists of an interesterified blend of 10% to 50% by weight of the interesterified blend of a second lauric fat, and 50% to 90% by weight of the interesterified blend of a palmitic fat having an iodine value of from 10 to 50. In some embodiments, a fat composition provided herein can have a solid fat content (SFC) of about 5% to 15% at 26.7° C. In some embodiments, a fat composition provided herein can have a Mettler Drop Point of about 30° C. to about 45° C., or about 32° C. to about 40° C., or about 35° C. to about 40° C.

In some embodiments, a palmitic fat in a crystal modifier can have an iodine value of from 25 to 40.

In some embodiments, a second lauric fat is included in a crystal modifier in an amount of 10% to about 30% by weight of the interesterified blend.

In some embodiments, a palmitic fat is included in a crystal modifier in an amount of about 70% to 90% by weight of the interesterified blend.

In some embodiments, a fat composition provided herein can be a beta prime crystal tending forming fat composition as determined by x-ray diffractometry (XRD).

In some embodiments, a first lauric fat included in a fat composition provided herein can be a non-hydrogenated whole coconut oil.

In some embodiments, a second lauric fat included in a crystal modifier provided herein can be a non-hydrogenated palm kernel oil or a fraction thereof.

In some embodiments, a palmitic fat included in a crystal modifier provided herein can be a stearin fraction of palm oil. In some embodiments, a palmitic fat is non-hydrogenated.

In some embodiments of a fat composition provided herein, a first lauric fat and a crystal modifier are not interesterified together.

In some embodiments, a fat composition provided herein can have a percent solids content of 15% and 20% at a time of 90 seconds at 0° C. as determined by rate of crystallization (ROC) analysis. In some embodiments, a fat composition can have a percent solids content of less than 35% at a time of 215 seconds at 0° C. as determined by ROC analysis.

Also provided herein are food ingredients. A food ingredient provided herein includes a fat composition described herein. In some embodiments, a food ingredient further includes coconut flour.

Food products are also provided herein. A food product includes a fat composition described herein and at least one food ingredient.

In some embodiments, a food product can be a filling, a spread, a coating, a particulate, a topping, a baked good, or a frosting.

In some embodiments, a food product can include a coconut flour.

In some embodiments, a food product can include 30-40% by weight of a fat composition provided herein, 8-15% by weight coconut flour, and 40-62% by weight bulking agent. In some embodiments, a bulking agent can include sugar and a flour.

Also provided herein are methods of making fat compositions. A method provided herein can include tempering a blend of a first lauric fat and a crystal modifier at 21° C. to 25° C. for 30 seconds to 300 seconds to produce the fat composition, where the fat composition includes at least 95% by weight of a blend of 55% to 90% by weight of the fat composition of a first lauric fat, and 5% to 45% by weight of the fat composition of a crystal modifier. A crystal modifier provided herein consists of an interesterified blend of 10% to 50% by weight of the interesterified blend of a second lauric fat, and 50% to 90% by weight of the interesterified blend of a palmitic fat having an iodine value of from 10 to 50, In some embodiments, a fat composition made by a method provided herein can be a beta prime crystal tending forming fat composition as determined by x-ray diffractometry (XRD).

In some embodiments, a method can include tempering that includes votation.

In some embodiments of a method provided herein, tempering can be done by votation at 22° C. to 24° C. at exit of the last cooling unit, where the entire votation process is performed for 100 seconds to 200 seconds.

In some embodiments of a method provided herein, a second lauric fat can be included in a crystal modifier in an amount of 10% to about 30% by weight of the interesterified blend.

In some embodiments of a method provided herein, a palmitic fat can be included in a crystal modifier in an amount of about 70% to 90% by weight of the interesterified blend.

In some embodiments of a method provided herein, a first lauric fat and crystal modifier are not interesterified together.

These and various other features and advantages will be apparent from a reading of the following detailed description.

DETAILED DESCRIPTION

Consumers want opportunities to enjoy various foods without consuming trans-fatty acids. Creating food products that provide an enjoyable eating experience without the use of oils containing trans-fatty acids can pose a challenge. This is particularly problematic for foods that are stored at room temperature or higher because oils lacking trans-fatty acids can have a tendency to melt at temperatures near room temperature, causing the oils to migrate over time and make the food and/or its packaging appear or feel greasy.

Oils that contain high levels of lauric acid are popular with consumers because of their tendency to melt easily in the mouth. However, lauric fats, such as coconut oil, coconut oil fractions, palm kernel oil, and palm kernel oil fractions, tend to have low solid fat content (SFC) at room temperature or above, making them difficult to handle during storage, shipping, or manufacture of food products. Difficulties include melting to a liquid or semi-liquid form, which can require the use of special handling techniques and/or containers. In addition, techniques for plasticizing and/or tempering fats, such as scraped surface heat exchange (i.e., votation), are difficult to use with fat compositions with high lauric fat content. This can be attributed to swift melting and recrystallization of lauric fats, which can cause the fat to have a tendency to have a SFC content too low to provide good tempering, or too high, which can seize scraped surface heat exchange machinery, with little opportunity to operate in a window in between. As a result, use of fat compositions with high lauric fat content can pose a challenge for use in manufacturing food products, particularly in large scale production settings.

In addition, fat compositions with high lauric fat content can pose challenges in products that are formulated to have a room temperature shelf life. For example, fat compositions with high lauric fat content can deform and/or migrate during shelf life at room temperature when used in food products.

As used herein, the term "lauric fat" refers to triglyceride oils and fats that have at least 40% of the fatty acids on the triglycerides being lauric fatty acid. Examples of lauric fats include whole coconut oil, coconut oil fractions, whole palm kernel oil, palm kernel oil fractions, other vegetable or algal oils containing at least 40% lauric acid, and combinations thereof. As used herein, a fat composition having a high lauric fat content contains at least 40% by weight of a lauric fat.

In the process of making a filling for a hard biscuit sandwich that had a prolonged shelf life at room temperature, it was desired to use a coconut butter as a filling. However, due to the high coconut oil content in coconut butter, several of the challenges described above needed to be overcome. In addition, it was important that any solution retained the desired quick melting perception in the mouth typically associated with coconut oil and other lauric fats in order to provide consumers with a delightful eating experience. Further, in order to avoid health concerns with trans-fatty acids, partially hydrogenated fats were to be avoided, and preferably fats that were modified with any hydrogenation would also be avoided in order to meet consumer preferences.

In order to address the challenges that face fat compositions with high lauric fat content while meeting the desired traits for a filling described above, it was initially believed that addition of a hardstock fat, such as a stearin fraction of palm oil, could harden a fat composition with high lauric fat content sufficiently to achieve at least a 10% solids content at processing temperatures, such as at about 26-27° C. However, it was discovered that the resulting fat composition added an unexpectedly chalky and grainy texture to the filling.

It was then discovered that a crystal modifier that consisted of an interesterified blend of a lauric fat and a palmitic fat could be added to a lauric fat to result in a fat composition that could be votated and more easily handled at processing temperatures (e.g., 20° C. to 25° C.), while avoiding an unpleasant mouthfeel, such as a chalky or grainy mouthfeel.

In addition, it is believed that this discovery could be applied not only to coconut oil, but also other lauric fats, and the resulting composition could be applied to other food products than the originally tested filling. For example, a fat composition provided herein can be used in, for example, spreads, toppings, coatings, particulates, baked goods, or frostings.

A fat composition provided herein includes at least 95% (e.g., at least 98%, at least 99%, or 100%) by weight of a non-interesterified blend of a first lauric fat and a crystal modifier. A first lauric fat is included in the non-interesterified blend in an amount of from 55% to 90% (e.g., from about 60% to about 80%) by weight of a fat composition provided herein. A first lauric fat can be any lauric fat. In some embodiments, a first lauric fat can be a whole coconut oil, a coconut oil fraction, a whole palm kernel oil, a palm kernel oil fraction, or combinations thereof. A first lauric fat is non-hydrogenated. In some embodiments, a first lauric fat is also non-interesterified. A first lauric fat can be raw or processed using any standard processing. For example, in some embodiments, a first lauric fat can be refined, bleached, and deodorized (RBD).

In some embodiments, a first lauric fat can have a Mettler Drop Point (MDP) of from about 20° C. to about 34° C. (e.g., from about 20° C. to about 30° C., or from about 20° C. to about 28° C.). In some embodiments, a first lauric fat can have an iodine value (IV) of from about 5 to about 21 (e.g., from about 14 to about 21, or from about 7 to about 11).

A crystal modifier is included in a fat composition provided herein in an amount of from 5% to 45% (e.g., from about 10% to about 40%, or from about 25% to about 40%) by weight of the fat composition. A crystal modifier described herein consists of an interesterified blend of a second lauric fat and a palmitic fat. A crystal modifier provided herein includes a second lauric fat in an amount of from 10% to 50% (e.g., from about 10% to about 30%, from about 12% to about 18%, or about 15%) by weight of the crystal modifier. As with the first lauric fat, a second lauric fat can be any lauric fat. In some embodiments, a first lauric fat is a whole coconut oil, a coconut oil fraction, a whole palm kernel oil, a palm kernel oil fraction, or combinations thereof. The second lauric fat can be the same or different from the first lauric fat.

In some embodiments, a second lauric fat can have a MDP of from about 20° C. to about 34° C. (e.g., from about 20° C. to about 30° C., or from about 20° C. to about 28° C.). In some embodiments, a second lauric fat can have an IV of from about 5 to about 21 (e.g., from about 14 to about 21, or from about 7 to about 11).

A crystal modifier described herein includes a palmitic fat in an amount of from 50% to 90% (e.g., from about 70% to about 90%, from about 80% to about 90%, or about 85%) by weight of the crystal modifier. The palmitic fat included in a crystal modifier described herein has an iodine value (IV) of from 10 to 50 (e.g., from about 14 to about 40, or from about 25 to about 40). Iodine value is measured by cyclohexane method according to AOCS Cd 1b-87 (Firestone, D. (Ed.). (2009). *Official Methods and Recommended Practices of the AOCS* (6$^{th}$ ed.). AOCS Press.). In some embodiments, a palmitic fat included in a crystal modifier described herein can have a MDP of from about 37° C. to about 60° C. (e.g., from about 50° C. to about 60° C.).

As used herein, the term "palmitic fat" refers to triglyceride oils and fats that have at least 40% of the fatty acids on the triglycerides being palmitic fatty acid. Examples of palmitic fats include whole palm oil, a palm oil fraction, other vegetable or algal oils containing at least 40% palmitic acid, and combinations thereof. In some embodiments, a palmitic fat is non-hydrogenated.

In some embodiments, additional fat ingredients or emulsifiers can be included in amounts of 5% or less (e.g., less than 2%, or less than 1%). In some embodiments, a fat composition provided herein can include essentially no additional fat ingredients. In some embodiments, a fat composition provided herein can include essentially no emulsifiers. As used herein, the term "essentially no" means that an ingredient is excluded from a fat composition, or is only included in trace amounts so as to have negligible functional effects on the fat composition.

A fat composition provided herein can have a solid fat content (SFC) of from about 5% to about 15% (e.g., about 7-12%) at 26.7° C. SFC is measured by nuclear magnetic resonance (NMR) according to AOCS Cd 16b-93 (Firestone, D. (Ed.). (2009). *Official Methods and Recommended Practices of the AOCS* (6$^{th}$ ed.). AOCS Press.). An SFC of from about 5% to about 15% at 26.7° C. can provide sufficient hardness for a fat composition to remain solid at room temperature, yet not so hard as to cause seizure of scraped surface heat exchange equipment during votation at a temperature of about 21° C., or cause a waxy mouthfeel when included in a food product. An SFC of from about 5% to about 15% at 26.7° C. can also provide sufficient solid fat content to avoid significant deformation of food products containing a fat composition provided herein when the food products stored at room temperature. In addition, an SFC of from about 5% to about 15% at 26.7° C. can reduce oiliness or stickiness of a food product stored at room temperature.

A fat composition provided herein can have a Mettler Drop Point (MDP) of from about 30° C. to about 40° C. (e.g., from about 32° C. to about 40° C., or from about 35° C. to about 40° C.). MDP is measured according to AOCS Cc 18-80 (Firestone, D. (Ed.). (2009). *Official Methods and Recommended Practices of the AOCS* (6$^{th}$ ed.). AOCS Press.). A MDP of from about 30° C. to about 40° C. can prevent melting of a fat composition provided herein when being handled at temperatures frequently seen during storage, shipping, and handling found in large scale food production settings. In addition, a MDP of from about 30° C. to about 40° C. can prevent melting of a fat composition provided herein when incorporated into a food that is stable at room temperature during typical packaging, handling, shipping, and storage of the food. A MDP of below 30° C. may not provide sufficient handling benefits, while a MDP above 40° C. may contribute a waxy mouthfeel to food products.

Figure 1:
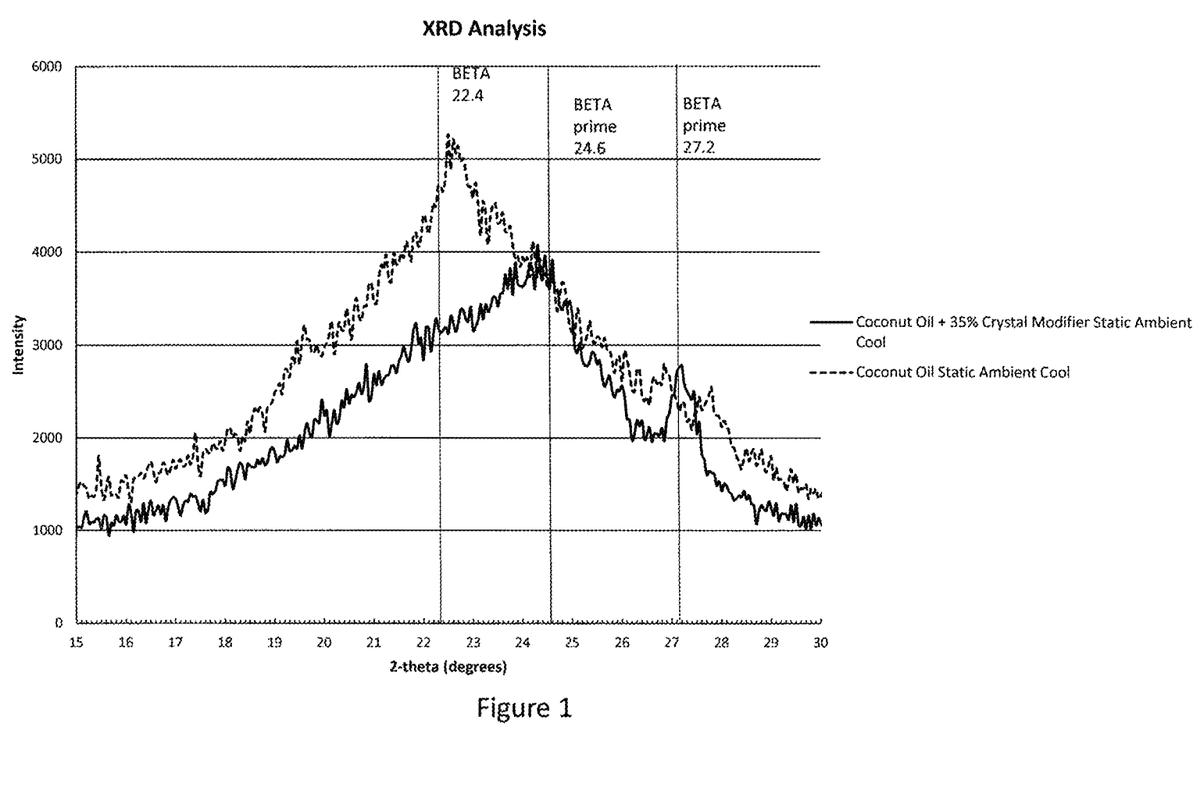
FIG. 1 shows a graph of x-ray diffractometry (XRD) results for coconut oil and a fat composition provided herein, comprising a first lauric fat and a crystal modifier, where the coconut oil and the lauric fat+crystal modifier composition were allowed to crystallize in static ambient conditions.
Figure 2:
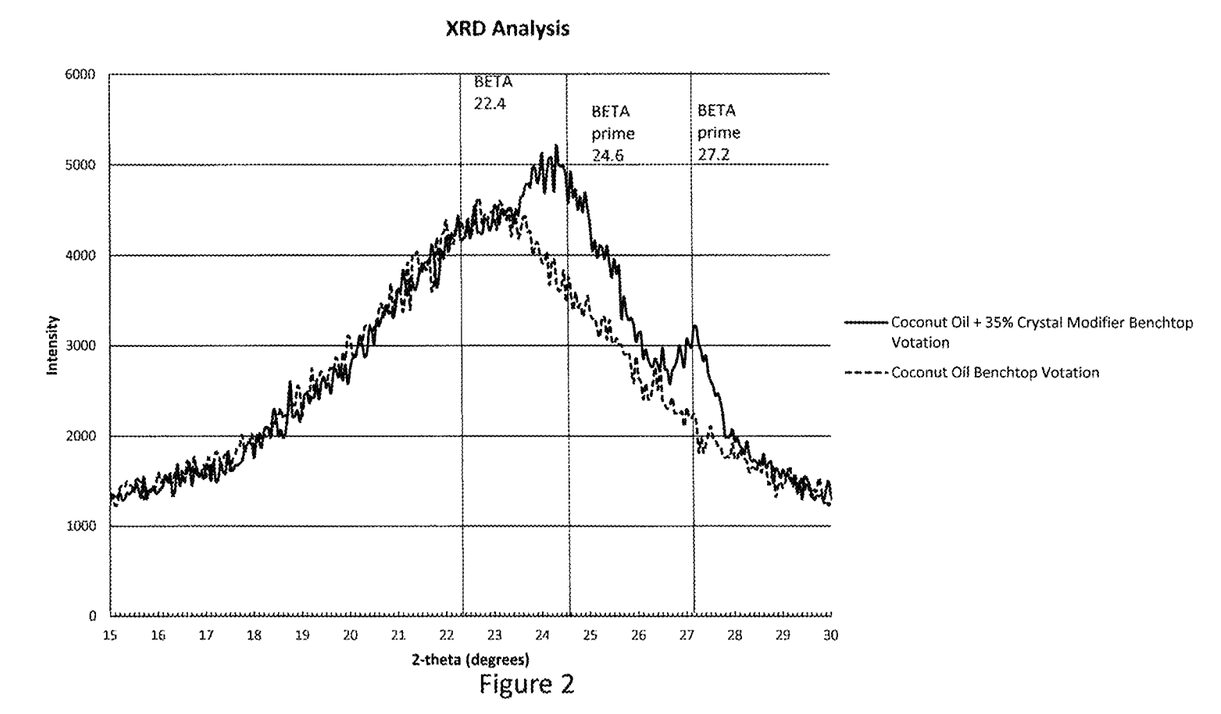
FIG. 2 shows a graph of x-ray diffractometry (XRD) results for coconut oil and a fat composition provided herein, comprising a first lauric fat and a crystal modifier, where the coconut oil and the lauric fat+crystal modifier composition were allowed to crystallize in benchtop votation conditions.
Figure 3:
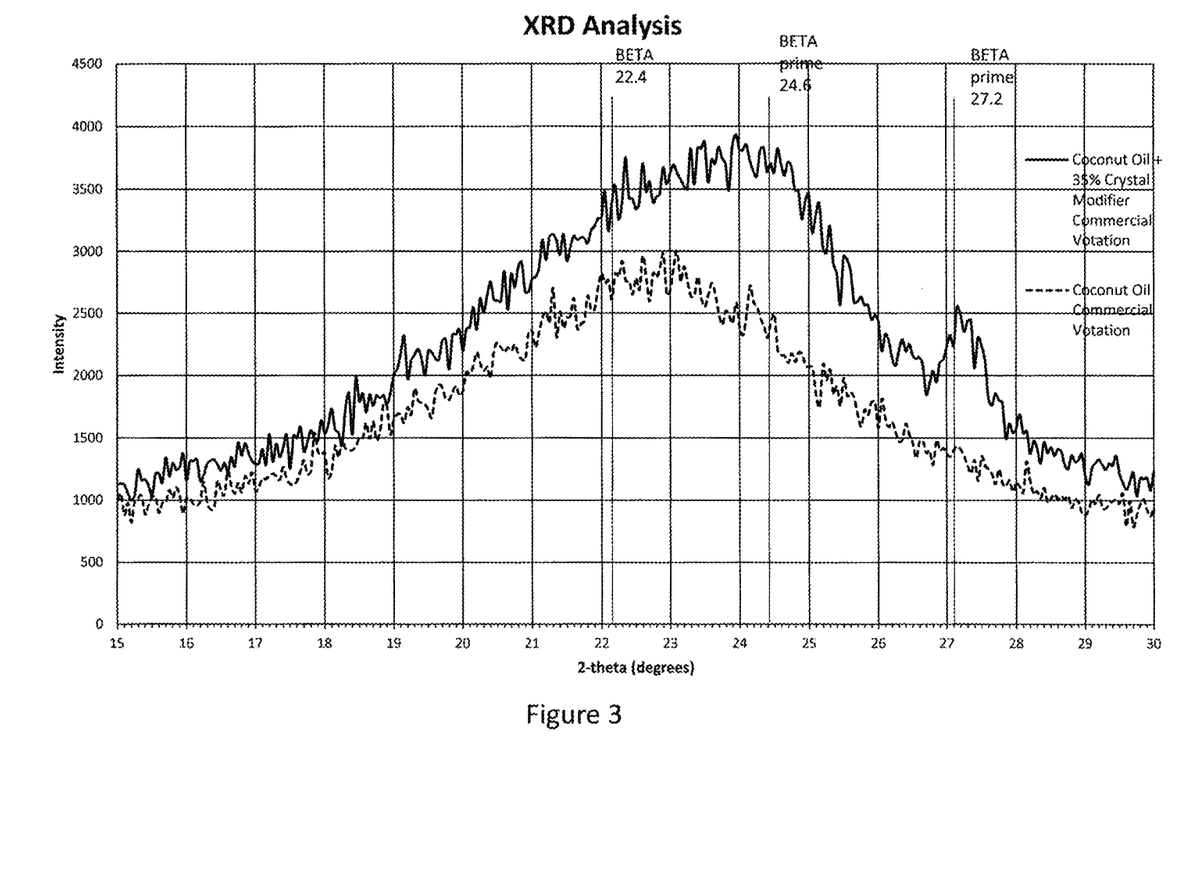
FIG. 3 shows a graph of x-ray diffractometry (XRD) results for coconut oil and a fat composition provided herein, comprising a first lauric fat and a crystal modifier, where the coconut oil and the lauric fat+crystal modifier composition were allowed to crystallize in commercial votation conditions.
Figure 4:
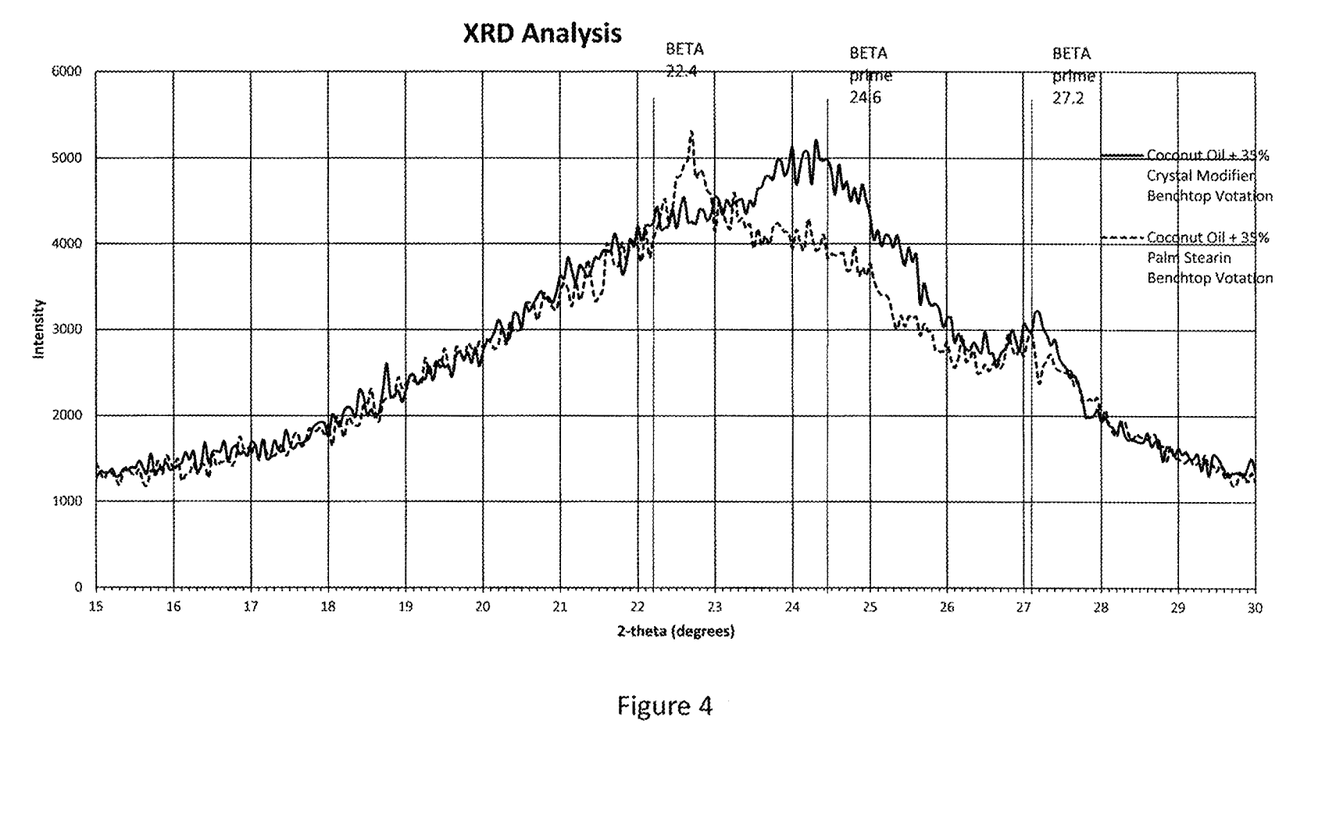
FIG. 4 shows a graph of x-ray diffractometry (XRD) results for a fat composition provided herein, comprising a first lauric fat and a crystal modifier, and a coconut oil+palm stearin fraction composition, where the lauric fat+crystal modifier composition and the coconut oil+palm stearin fraction composition were allowed to crystallize in benchtop votation conditions.
Figure 5:
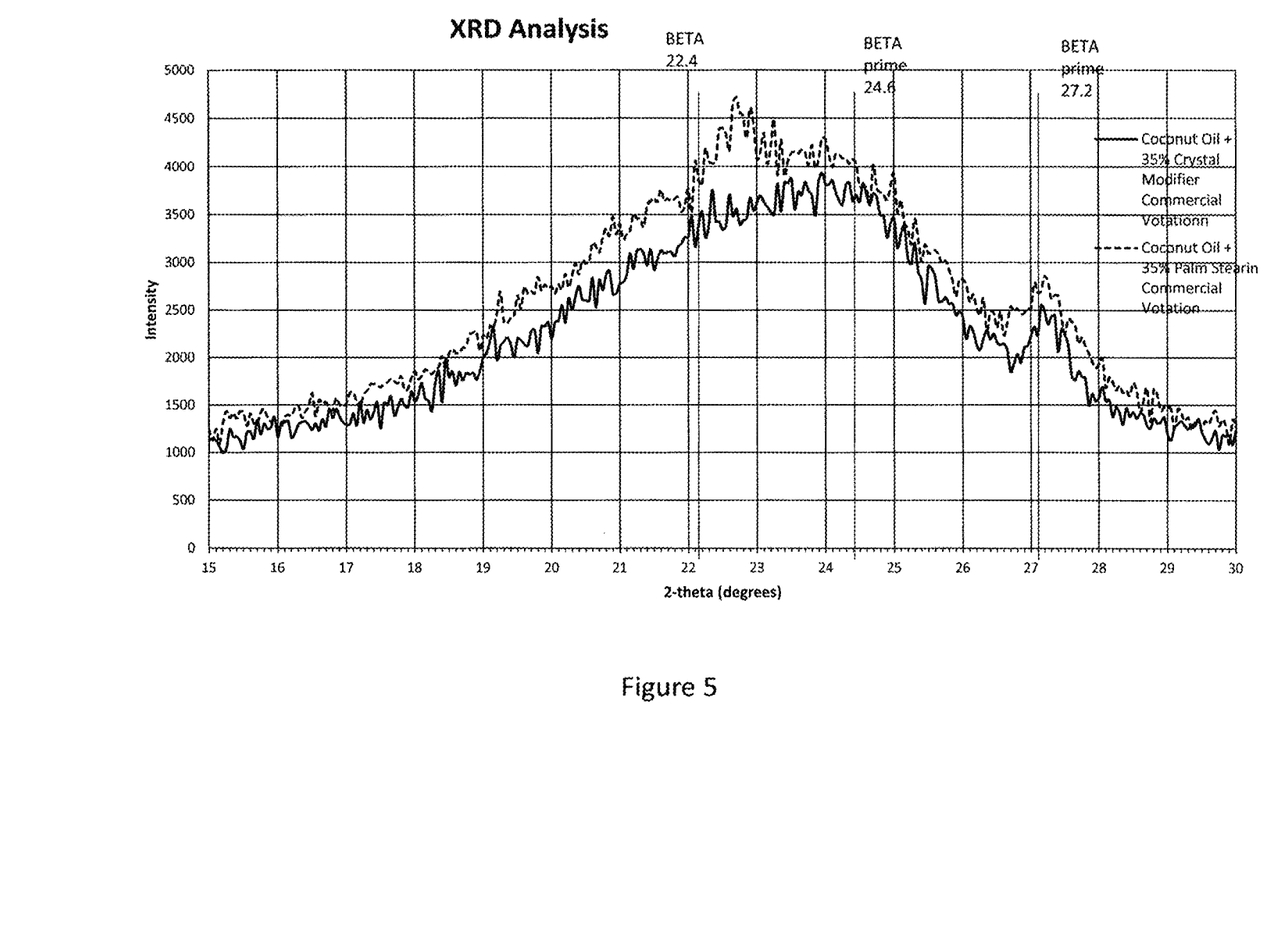
FIG. 5 shows a graph of x-ray diffractometry (XRD) results for a fat composition provided herein, comprising a first lauric fat and a crystal modifier, and a coconut oil+palm stearin fraction composition, where the lauric fat+crystal modifier composition and the coconut oil+palm stearin fraction composition were allowed to crystallize in industrial scale votation conditions.
Figure 6:
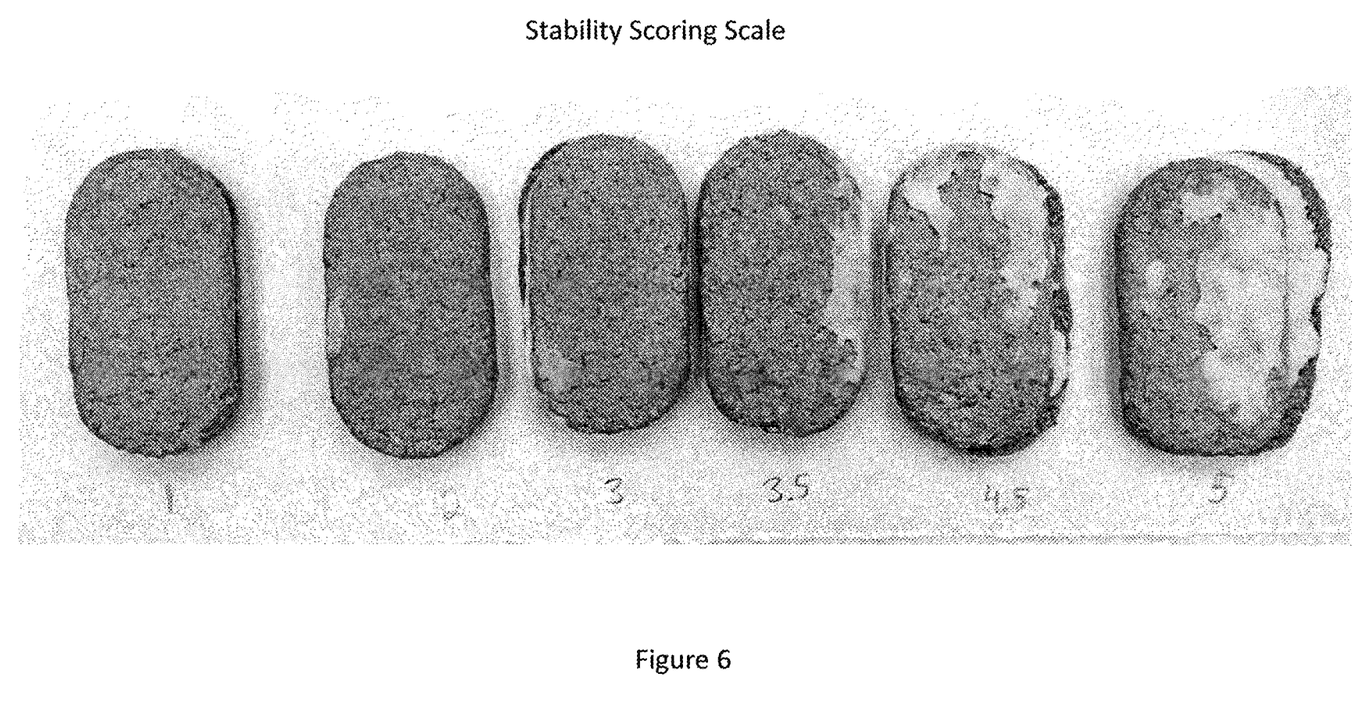
FIG. 6 shows a picture depicting the scale by which stability of a filling that includes a lauric fat+crystal modifier was judged, with 1 being the most stable and 5 being most unstable.

A fat composition provided herein has a non-grainy texture in the mouth. A fat composition provided herein can also contribute to a smooth and/or creamy, non-grainy mouthfeel in a food product containing the fat composition. Without being bound by theory, it is believed that a fat composition provided herein is a beta prime tending crystal forming fat during crystallization (with or without votation) at 22° C. to 23° C., as shown in FIG. 1 and FIG. 2. In non-chocolate fats (e.g., cocoa butter), beta prime crystals are associated with a pleasant mouthfeel and smooth texture in fats. In contrast, it was observed that coconut oil alone is a beta tending crystal forming fat during crystallization (with or without votation) at 22° C. to 23° C., as shown in FIGS. 1-3. Similarly, coconut oil combined with a stearin fraction of palm oil is a beta tending crystal forming fat during votation at 22° C. to 23° C. (see, FIGS. 4 and 5). In non-chocolate (e.g., cocoa butter) type fats, beta type crystals are generally associated with a grainy or coarse mouthfeel due to the configuration of beta type crystals. This is particularly surprising since lauric fats, such as coconut oil and palm kernel oil, and palmitic fats, such as palm oil and palm oil stearin fractions, are frequently described as beta prime tending crystal forming.

Crystal formation type can be determined using x-ray diffraction analysis of fats (XRD). XRD is performed using a TERRA Mobile XRD System (Olympus Scientific Solutions Americas Inc., Waltham, Mass., USA) by pressing a sample onto the window of the sample plate without compressing the sample in a particular direction or pressing excessively, and measuring x-ray diffraction according to the manufacturer's instructions. The results of XRD are graphed with diffraction angle in degrees 2θ (2-theta) along the x-axis and intensity of signal along the y-axis. As shown in FIGS. 1-3, a beta tending crystal forming fat composition has a prominent peak, as determined by peak signal intensity, around 22.4° 2θ (see, the dotted lines representing coconut oil), while a beta prime tending forming fat composition has a prominent peak, as determined by peak signal intensity, around 24.6° 2θ and a secondary peak around 27.2° 2θ (see, the solid lines representing coconut oil+35% crystal modifier). A fat composition is considered to be a beta tending crystal forming fat composition if the most prominent peak, as determined by peak signal intensity, is around 22.4° 2θ, or a beta prime tending crystal fat composition if the most prominent peak, as determined by peak signal intensity, is around 24.6° 2θ, along with a secondary peak at 27.2 2θ.

In some embodiments, a fat composition can have a particular rate of crystallization (ROC). For example, in some embodiments, a fat composition provided herein can have a percent solids as measured by rate of crystallization (ROC) analysis of from about 15% to about 25% (e.g., from 15% to 20%, or from 16% to 18%) at 90 seconds and 0° C. In some embodiments, a fat composition provided herein can also have a percent solids as measured by ROC analysis of less than about 35% (e.g. about 25% to about 32%, or about 28% to about 32%) at 215 seconds and 0° C. As used herein, ROC analysis is performed by melting the fat composition to be tested until the fat composition is fully melted. The melted fat is then aliquoted into several individual 180 mm×10 mm glass NMR tubes (one for each time point to be measured) and held at 60° C. for 15 minutes. The NMR tubes are then placed in a 0° C. water or air bath, and the percent solids content is measured at timed intervals using NMR according to AOCS Cd 16b-93.

A fat composition provided herein can be made using any appropriate method. In some embodiments, a first lauric fat and a crystal modifier are combined and tempered and/or plasticized using standard tempering and/or plasticizing equipment, such as a scraped surface heat exchanger. Examples of scraped surface heat exchangers include, for example, Votator® II manufactured by Waukesha Cherry-Burrell® (Delevan, Wis., USA), Contherm manufactured by Alfa Laval, Inc. (Richmond, Va., USA), Terlotherm manufactured by Terlet BV (Zutphen, Netherlands), and Gerstenberg Schroder Kombinator manufactured by SPXFlow (Soeborg, Denmark). A fat composition provided herein can be plasticized and/or tempered at a temperature of from about 21° C. to about 25° C. (e.g., from about 22° C. to about 24° C.) for about 30 seconds to about 300 seconds (e.g., from about 100 seconds to about 200 seconds) to produce a fat composition provided herein. If a scraped surface heat exchanger is used for tempering and/or plasticizing a fat composition, the temperature at the exit of the last cooling unit of the scraped surface heat exchanger can be from about 21° C. to about 25° C. (e.g., from about 22° C. to about 24° C.) prior to pin working. The entire votation process, including cooling and pin working, can take place over a period of from about 30 seconds to about 300 seconds (e.g., from about 100 seconds to about 200 seconds).

A fat composition provided herein can be combined with any other appropriate edible ingredient to produce a food ingredient and/or food product. For example, a fat composition provided herein can be combined with a coconut flour to make a coconut butter ingredient. In some embodiments of a coconut butter ingredient provided herein, a fat composition provided herein and a coconut flour can be combined such that the coconut oil content of first lauric fat plus the second lauric fat is included in the coconut butter ingredient in an amount that is about 1.5× to 3× (e.g., about 1.8× to about 2.6×) the amount of coconut flour in the coconut butter ingredient.

A fat composition provided herein can be included in a food ingredient or food product in any appropriate amount. For example, a fat composition provided herein can be included in a baked good in an amount of from about 5% to about 15% (e.g., about 5% to about 12%) by weight. In another example, a fat composition provided herein can be included in a filling or spread in an amount of from about 30% to about 50% (e.g., about 30% to about 40%) by weight. In another example, a fat composition provided herein can be included in a particulate in an amount of from about 15% to about 30% (e.g., from about 20% to about 25%) by weight. In yet another example, a fat composition provided herein can be included in a topping (e.g., a compound coating or a soft-set coating) in an amount of from about 30% to about 50% (e.g., from about 35% to about 45%) by weight. In a further example, a fat composition provided herein can be included in a frosting-like product in an amount of from about 10% to about 25% (e.g., from about 12% to about 20%) by weight.

In some embodiments, a fat composition provided herein can be used in a filling or spread that includes the fat composition in an amount of from about 30% to about 40% (e.g., about 34% to about 38%), a coconut flour in an amount of from about 8% to about 15% (e.g., from about 9% to about 13%), and a bulking agent in an amount of from about 40% to about 62% (e.g., from about 45% to about 55%). As used herein, a bulking agent can include a sugar (e.g., sucrose, fructose, and the like), a flour, a starch, or other food grade bulking agent, or any combination thereof.

The following examples are provided to show selected embodiments of the invention described herein. The examples are not intended to limit the invention to any particular embodiment.

EXAMPLES

Example 1—Fat Compositions

Fat compositions were produced by blending refined, bleached, and deodorized (RBD) whole coconut oil (IV about 8-9) with either a palm stearin having an IV of about 35 or a crystal modifier that was an interesterified combination of 85% palm stearin (IV about 35) and palm kernel oil (IV about 28), as set forth in Table 1. Briefly, each composition was made by melting each indicated component, and blending the molten ingredients together before cooling to room temperature. The fat compositions were tested for melting point as determined by Mettler Drop Point (MDP in Table 1), SFC melting curve profile, and rate of crystallization. Data for the SFC melting curve profile are presented in Table 2. Data for the rate of crystallization are presented in Table 3.

TABLE 1

| Fat composition | RBD coconut oil % wt | Palm stearin % wt* | Crystal modifier % wt** | Melting Point (MDP) ° C. |
|---|---|---|---|---|
| A | 100 | 0 | 0 | 26.4 |
| B | 70 | 30 | 0 | 39.2 |
| C | 65 | 35 | 0 | 43.9 |
| D | 70 | 0 | 30 | 35.9 |
| E | 65 | 0 | 35 | 36.7 |

*MDP about 55° C.
**MDP about 46° C.

TABLE 2

| Fat composition | Temperature | | | | |
| | 10° C. | 21.1° C. | 26.7° C. SFC (%) | 33.3° C. | 40° C. |
|---|---|---|---|---|---|
| A | 79.3 | 28.1 | 0 | 0 | 0 |
| B | 77.4 | 26.9 | 11.4 | 6.5 | 3.8 |
| C | 75.4 | 26.5 | 13.2 | 8.1 | 4.9 |
| D | 79.3 | 31.6 | 8.7 | 3.5 | 0.1 |
| E | 78.5 | 32.3 | 10.7 | 4.5 | 0.7 |

TABLE 3

| Time at 0° C. (sec) | Fat composition SFC (%) | | | | |
|---|---|---|---|---|---|
| | A | B | C | D | E |
| 30 | 0.0 | 6.6 | 7.8 | 4.0 | 6.1 |
| 60 | 1.4 | 12.7 | 13.9 | 10.7 | 12.9 |
| 90 | 7.5 | 16.0 | 16.9 | 15.4 | 17.3 |
| 120 | 15.5 | 19.8 | 19.7 | 18.8 | 20.8 |
| 155 | 21.9 | 22.8 | 22.0 | 21.5 | 23.4 |
| 185 | 30.7 | 25.3 | 24.7 | 24.6 | 26.2 |
| 215 | 39.8 | 30.4 | 28.1 | 27.9 | 29.3 |
| 240 | 49.1 | 36.7 | 32.1 | 33.6 | 34.6 |
| 270 | 53.0 | 46.6 | 38.8 | 42.1 | 42.9 |
| 300 | 56.4 | 56.7 | 47.9 | 54.1 | 54.4 |
| 330 | 62.3 | 64.9 | 57.5 | 63.4 | 64.0 |
| 375 | 68.5 | 70.5 | 64.1 | 69.8 | 70.3 |
| 405 | 72.9 | 73.1 | 68.6 | 73.2 | 73.9 |
| 435 | 77.2 | 75.5 | 71.7 | 76.0 | 76.2 |
| 465 | 79.2 | 77.2 | 73.9 | 77.8 | 77.8 |
| 495 | 80.6 | 78.6 | 75.6 | 78.9 | 79.4 |
| 530 | 77.3 | 79.6 | 76.9 | 79.9 | 80.5 |
| 560 | 82.4 | 80.1 | 77.7 | 80.9 | 80.8 |
| 590 | 83.0 | 80.7 | 78.6 | 81.6 | 81.4 |
| 620 | 83.7 | 81.2 | 79.3 | 82.1 | 82.0 |

Example 2—Mouthfeel

Fat compositions from Table 1 were used to make a filling by combining each of the fat compositions (~35% by weight) with coconut flour (~10% by weight), and filler ingredients (~55% by weight). The filling was then placed between two crispy biscuits to produce a crispy biscuit sandwich. The filling alone and the filling in the sandwiches were provided to several individual taste testers to evaluate mouth feel and flavor of the sandwiches, focusing on the filling, or the filling alone. Table 4 provides results of the mouthfeel testing.

TABLE 4

| Fat composition | Sandwich description | Filling description |
|---|---|---|
| A | Not tested | Softer mouthfeel, melts faster, cleaner coconut flavor, less residual mouth coating (but still powdery) |
| B | Coated mouth (but not waxy), grainy/chalky mouthfeel, masks sweetness of the filling, palm oil flavor finish (oxidized fat flavor) | Not tested |
| C | Coated mouth (but not waxy), grainy/chalky mouthfeel, masks sweetness of the filling, palm oil flavor finish (oxidized fat flavor) | Not tested |
| D | Better mouthfeel, slightly softer relative to E, clean coconut flavor | Not tested |
| E | Better mouthfeel, slightly firmer relative to D, clean coconut flavor | Stiffer mouthfeel, slight taste of palm oil, residual fat coating in the mouth (not unpleasant), slightly dry finish |

Example 3—Product Stability

Fat composition E from Table 1 was used to make a filling by combining the fat composition (~35% by weight) with coconut flour (~10% by weight), and filler ingredients (~55% by weight). A similar filling was made using a fat composition that included coconut oil+3.5% crystal modifier. Each of the fillings was then placed between two crispy biscuits to produce a crispy biscuit sandwich. The sandwiches were packaged (1 sandwich per sealed pouch) and placed in cartons (5 pouches per carton). Two cartons of each product were stored at each of the conditions in Table 5, then placed on a vibrating table for 1 hour. The cartons were allowed to reach room temperature before sandwiches were taken out of pouches to determine the stability of the filling based on whether the filling had escaped from between the biscuits or whether biscuits had shifted relative to each other, and scoring the stability based on the scale shown in FIG. 5, with 1 being the most stable and 5 being most unstable. Table 6 shows the results of the average score for crispy biscuit sandwiches that included a filling comprising fat composition E, and crispy biscuit sandwiches that included filling that used coconut oil+3.5% crystal modifier.

TABLE 5

| Condition | Description | Notes |
|---|---|---|
| 1 | 70 F. 3 days | Control |
| 2 | 85 F. 3 days | Similar to warm warehouse conditions or inner cases during long shipment |
| 3 | 90 F. 1 day | Similar to warehouse conditions or typical for pallet on truck |
| 4 | 90 F. 3 days | Similar to warehouse conditions or typical for pallet on truck |
| 5 | 100 F. 6 hrs | Similar to conditions for an outer cube for 1 day in typical summer truck |
| 6 | 100 F. 24 hrs | Similar to conditions for an outer cube for 4 days in typical summer truck |
| 7 | 113 F. 4 hrs | Similar to conditions for an outer cube for 1 day in a stationary hot truck on a very hot day |

TABLE 6

| | Score | |
|---|---|---|
| Condition | Sample E | Coconut oil + 3.5% Crystal Modifier |
| 1 | 1 | 1 |
| 2 | 1 | 3 |
| 3 | 1 | 4 |
| 4 | 1 | 4.5 |
| 5 | 1 | 4 |
| 6 | 1 | 4.5 |
| 7 | 1.5 | 4.5 |

Example 4—Crystal Type

Samples A and C from Table 1 were either melted, and allowed to re-crystallize at room temperature in static conditions, or were melted, and votated using a countertop ice cream making machine (Musso Model L2, Musso S. R. L., Mortara, Italy), or votated using commercial votation equipment (Kombinator), and then held at room temperature. X-ray diffractometry (XRD) was then performed on each of the samples. Briefly, XRD was performed using a TERRA Mobile XRD System (Olympus Scientific Solutions Americas Inc., Waltham, Mass., USA) by pressing a sample onto the window of the sample plate without compressing the sample in a particular direction or pressing excessively, and measuring x-ray diffraction according to the manufacturer's instructions. The results of XRD are graphed in FIGS. 1-5, with diffraction angle in degrees 2θ (2-theta) along the x-axis and intensity of signal along the y-axis, and described in Table 7. As shown in FIGS. 1 and 2, Sample A from Table 1 (Coconut Oil) is a beta tending crystal forming fat composition, with the most prominent peak, as determined by highest signal intensity, around 22.4° 2θ. Similarly, Sample C from Table 1 (Coconut Oil+35% Palm Stearin) is a beta tending crystal forming fat composition, with the most prominent peak, as determined by highest signal intensity, around 22.4° 2θ. In contrast, as shown in FIGS. 1-5, Sample E from Table 1 (Coconut Oil+35% Crystal Modifier) is a beta prime tending forming fat composition, with the most prominent peak, as determined by highest signal intensity, around 24.6° 2θ and a secondary peak around 27.2° 2θ.

TABLE 7

| Fat | Cooling Condition | Predominant Crystal Type |
| --- | --- | --- |
| Sample A | Static Ambient | Beta |
| Sample A | Benchtop | Beta |
| Sample A | Kombinator | Beta |
| Sample C | Static Ambient | Beta Prime |
| Sample C | Benchtop | Beta |
| Sample C | Kombinator | Beta with small beta prime peak |
| Sample E | Static Ambient | Beta Prime |
| Sample E | Benchtop | Beta Prime |
| Sample E | Kombinator | Beta Prime |

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A fat composition, comprising at least 95% by weight of a blend of:
   a. 55% to 90% by weight of the fat composition of a first lauric fat, and
   b. 5% to 45% by weight of the fat composition of a crystal modifier consisting of an interesterified blend of:
      i. 10% to 18% by weight of the interesterified blend of a second lauric fat, the second lauric fat having an iodine value of 14 to; and
      ii. 80% to 90% by weight of the interesterified blend of a palmitic fat having an iodine value of from to 40, the fat composition having a solid fat content (SFC) of about 5% to 15% at 26.7° C. and a Mettler Drop Point of about 30° C. to about 45° C.

2. The fat composition of claim 1, wherein the fat composition has a Mettler Drop Point of about 32° C. to about 40° C.

3. The fat composition of claim 2, wherein the fat composition has a Metter Drop Point of about 35° C. to about 40° C.

4. The fat composition of claim 1, wherein the fat composition is a beta prime crystal tending forming fat composition as determined by x-ray diffractometry (XRD).

5. The fat composition of claim 1, wherein the first lauric fat is a non-hydrogenated whole coconut oil.

6. The fat composition of claim 1, wherein the second lauric fat is non-hydrogenated palm kernel oil or a fraction thereof.

7. The fat composition of claim 1, wherein the palmitic fat is a stearin fraction of palm oil.

8. The fat composition of claim 1, wherein the palmitic fat is non-hydrogenated.

9. The fat composition of claim 1, wherein first lauric fat and crystal modifier are not interesterified together.

10. The fat composition of claim 1, wherein the fat composition has a percent solids content of 15% and 20% at a time of 90 seconds at 0° C. as determined by rate of crystallization (ROC) analysis.

11. The fat composition of claim 1, wherein the fat composition has a percent solids content of less than 35% at a time of 215 seconds at 0° C. as determined by ROC analysis.

12. A food ingredient, comprising the fat composition of claim 1 and further comprising coconut flour.

13. A food product, comprising the fat composition of claim 1, further comprising at least one food ingredient.

14. A food product, comprising the at least one food ingredient of claim 13 and at least one additional food ingredient.

15. The food product of claim 13, wherein the food product is a filling, a spread, a coating, a particulate, a topping, a baked good, or a frosting.

16. A food product comprising 30-40% by weight of the fat composition of claim 1, 8-15% by weight coconut flour, and 40-62% by weight bulking agent.

17. The food product of claim 16, wherein the bulking agent comprises sugar and a flour.

18. (Withdrawn; Currently Amended) A method of making a fat composition comprising, tempering a blend of a first lauric fat and a crystal modifier at 21° C. to 25° C. for 30 seconds to 300 seconds to produce the fat composition, where the fat composition comprises at least 95% by weight of a blend of:
   a. 55% to 90% by weight of the fat composition of a first lauric fat, and
   b. 5% to 45% by weight of the fat composition of a crystal modifier consisting of an interesterified blend of:
      i. 10% to 18% by weight of the interesterified blend of a second lauric fat, the second lauric fat having an iodine value of 14 to 21; and
      ii. 80% to 90% by weight of the interesterified blend of a palmitic fat having an iodine value of from 25 to 40,
   c. wherein the fat composition is a beta prime crystal tending forming fat composition as determined by x-ray diffractometry (XRD).

19. The method of claim 18, wherein the tempering comprises votation.

20. The method of claim 18, wherein the tempering is done by votation at 22° C. to 24° C. at exit of the last cooling unit, where the entire votation process is performed for 100 seconds to 200 seconds.

21. The method of claim 18, wherein first lauric fat and crystal modifier are not interesterified together.

* * * * *

UNITED STATES PATENT AND TRADEMARK OFFICE
CERTIFICATE OF CORRECTION

PATENT NO.       : 10,660,347 B2                                     Page 1 of 1
APPLICATION NO.  : 15/425741
DATED            : May 26, 2020
INVENTOR(S)      : Davlin et al.

It is certified that error appears in the above-identified patent and that said Letters Patent is hereby corrected as shown below:

In the Claims

Column 11, Claim 1, Line 9 should read:
"iodine value of 14 to 21; and".

Column 11, Claim 1, Line 11 should read:
"a palmitic fat having an iodine value of from 25 to 40,".

Column 12, Claim 18, Line 1 "(Withdrawn; Currently Amended)" should be deleted.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*